United States Patent [19]

Boyd

[11] 4,207,866
[45] Jun. 17, 1980

[54] SOLAR HEATING SYSTEM INCLUDING FREEZE PROTECTION

[76] Inventor: Rodney E. Boyd, 2132 Ardley Rd., Juno, Fla. 33408

[21] Appl. No.: 972,094

[22] Filed: Dec. 21, 1978

Related U.S. Application Data

[63] Continuation of Ser. No. 833,543, Sep. 15, 1977, abandoned.

[51] Int. Cl.² .................................................. F24J 3/02
[52] U.S. Cl. ..................................... 126/420; 126/434; 126/437
[58] Field of Search ................ 126/420, 434, 437, 432; 137/62; 237/80

[56] References Cited

U.S. PATENT DOCUMENTS

| | | | |
|---|---|---|---|
| 2,469,496 | 5/1949 | Christenson | 126/437 X |
| 3,382,917 | 5/1968 | Rice | 165/107 |
| 3,602,856 | 8/1971 | White | 165/107 |
| 3,608,818 | 9/1971 | von Fellenberg | 237/63 X |
| 3,986,489 | 10/1976 | Schlesinger | 126/422 X |
| 4,019,495 | 4/1977 | Frazier et al. | 126/420 |
| 4,044,754 | 8/1977 | Cronin et al. | 126/420 |
| 4,116,219 | 9/1978 | Nurnberg | 126/420 |
| 4,119,087 | 10/1978 | Cook | 126/420 |
| 4,133,338 | 1/1979 | Honikman | 126/420 |

Primary Examiner—James C. Yeung
Assistant Examiner—Larry Jones
Attorney, Agent, or Firm—Jack N. McCarthy

[57] ABSTRACT

A solar water heating system under normal operating conditions permits water to be circulated by a pump from a hot water storage tank through a one-way check valve and a solar collector back into the hot water storage tank when energy can be transferred from the solar collector to the water passing through. When the solar collector drops to a temperature where it is no longer desirable to transfer energy to the water, the pump ceases operation. If the outside ambient temperature drops further to a level where the water in the system affected thereby would be in danger of freezing, the pump is electrically energized by means of a freeze sensor to circulate the warmer water from the storage tank through the solar collector back to the tank. The water storage tank has a standby electrical heating unit. If electrical power fails, causing the pump to cease operation, a flow bypass means is opened to permit water to have reverse flow from said tank through said solar collector and back into the tank by natural convection. The reverse flow bypass means permits reverse flow due to convection around the one-way check valve and the pump, if the pump is one which provides a restriction to reverse flow.

10 Claims, 4 Drawing Figures

SOLAR HEATING SYSTEM INCLUDING FREEZE PROTECTION

This is a continuation of application Ser. No. 833,543, filed Sept. 15, 1977 and now abandoned.

BACKGROUND OF THE INVENTION

This invention relates to the freeze protection of solar systems, especially after the loss of externally supplied power.

A typical installation includes a solar collector, a water storage tank and interconnecting conduit means where a circulating pump circulates the water through the system. The pump is controlled by a differential control unit which senses the temperature in the collector and at the bottom of the storage tank. When the temperature in the solar collector is a predetermined number of degrees warmer than the bottom of the storage tank, the pump starts to circulate the water. When the temperature differential drops below the selected differential, the pump stops circulating the water. However, this installation can also be equipped with a freeze sensor so that when the temperature at the outlet of the solar collector drops to some predetermined value, for example, approximately 37° F., the sensor activates the circulating pump and allows the warmer water in the storage tank to flow through the solar collector to prevent freezing. As the temperature rises to approximately 60° F., this is sensed by the freeze sensor, and the circulating pump ceases operation and flow stops.

Another means of protecting a solar system is to drain the water from the solar collector and all conduits which could be affected by the freezing weather. After the freezing weather has left, the system can be refilled for subsequent use.

Another means used in solar water heating systems where freezing temperatures are encountered, is the use of a heat exchanger means where an antifreeze solution may be used as the heat collection fluid which is subjected to the freezing temperatures. Freeze protection means are shown in U.S. Pat. Nos. 3,986,489 and 4,019,495.

SUMMARY OF THE INVENTION

A primary object of the present invention is to provide an improved solar water heating system which can be protected against freezing temperatures.

In accordance with the present invention, to prevent freezing, a solar water heating system is provided which circulates the water in the system from the water storage tank through a one-way check valve and a solar collector back into the water storage tank to circulate the warmer water, and if electrical power fails, a reverse flow bypass means permits reverse flow due to convection around the one-way check valve and also the pump, if the pump is one which provides a restriction to reverse flow. If the pump is one which does not provide a restriction to reverse flow therethrough, it would not be necessary for the flow bypass means to include the pump.

In accordance with a further aspect of the present invention, the hot water outlet from the water storage tank and the return from the solar collector to the water storage tank are connected to provide two inlets for the convection flow.

In accordance with another aspect of the present invention, the flow bypass means comprises a solenoid valve in a bypass conduit which is normally, usually spring biased, open with the solenoid being connected to an electrical supply for holding the valve closed, against the spring action, during normal operating conditions when there is electrical power. Electrical power failure cuts off the supply to said solenoid which permits the solenoid valve to become normally open, by action of its spring.

In accordance with another aspect of the present invention, the flow bypass means comprises a thermally controlled valve in a bypass conduit which is normally closed with the valve being connected to a second freeze sensor whose temperature is set below the sensing temperature of the first freeze sensor which activates the circulating pump. It can be seen that this action will open the flow bypass means when the first freeze sensor has failed to activate the pump, permitting reverse flow by convection.

BRIEF DESCRIPTION OF THE DRAWINGS

FIG. 4 is a modification of a part of FIG. 1 wherein the hot water outlet of the water storage tank and the inlet from the solar collector are connected to provide two inlets when flow by natural convection is called for.

DESCRIPTION OF THE PREFERRED EMBODIMENT

Figure 1:
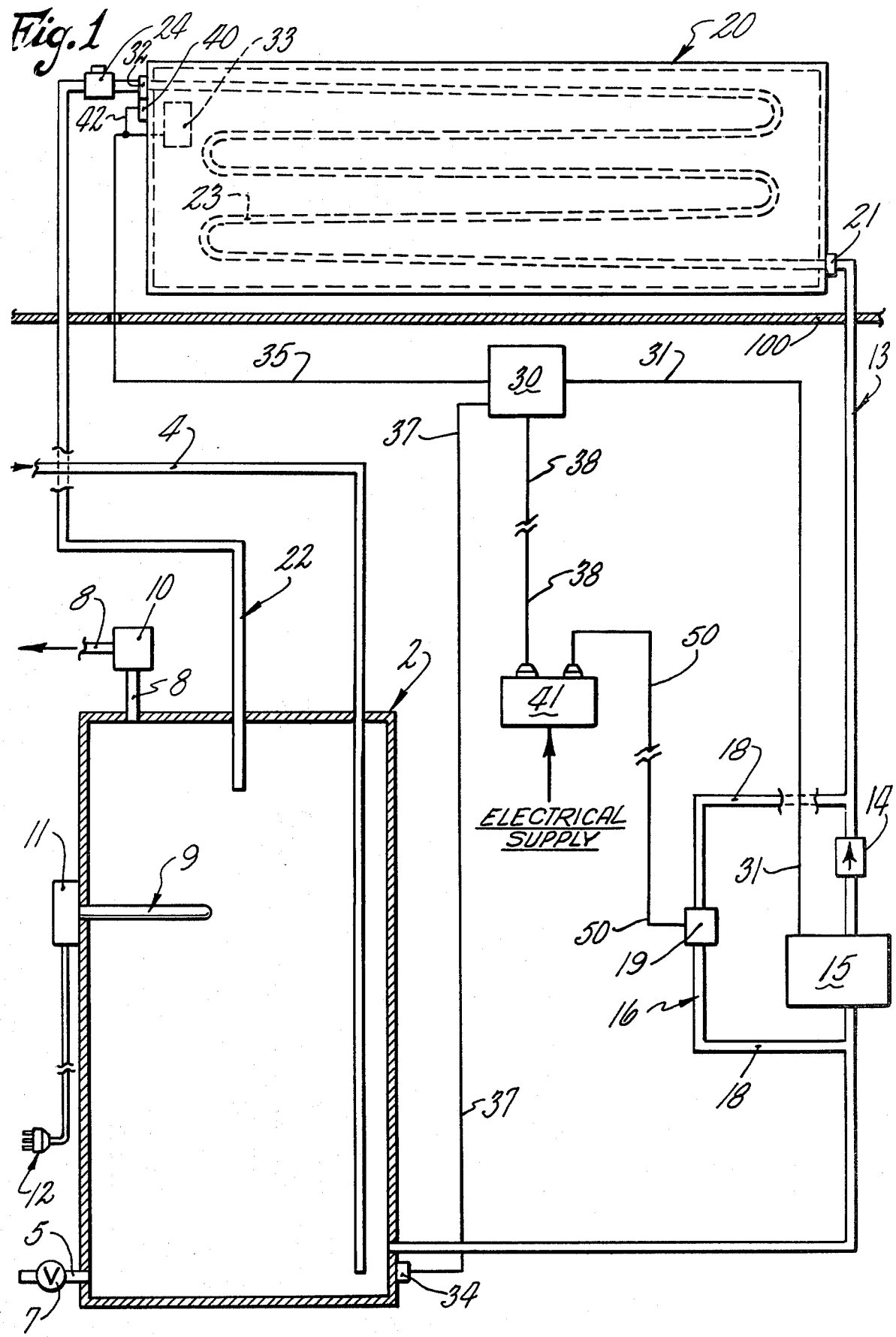
FIG. 1 is a schematic view of a solar water heating system including a bypass connection providing for flow due to natural convection to prevent freezing.

In FIG. 1, the water storage tank 2 is shown having a pressurized water supply directed to a location near the bottom of the interior of the tank by a conduit 4 which extends through the top thereof. An on-off control valve (not shown) is placed in conduit 4 to turn off the water supply when desired. Hot water is directed from the water storage tank 2 by a conduit 8 to an area where it is wanted. A conventional relief valve 10 is located in conduit 8. A secondary heating device 9 is shown located in the water storage tank 2 with an external junction box 11 with an electrical cord and plug 12 being connected thereto for connection to a proper electrical source. This heating device 9 can be an electrical heating unit as used in many conventional electrical hot water heaters. A drain pipe 5 at the bottom of water storage tank 2 has an on-off valve 7 if the system needs to be drained. The interior of the bottom of the water storage tank 2 is connected to an inlet 21 of a solar collector 20 by conduit means 13. The conduit means 13 includes a one-way check valve 14 and a pump 15. A bypass means 16 has a conduit 18 with one end connected to conduit means 13 downstream of the one-way check valve 14 while the other end is connected upstream of the inlet of the pump 15. A solenoid valve 19, spring biased to a closed position, is located in conduit 18 for a purpose to be hereinafter disclosed.

An outlet 32 of the solar collector 20 is connected by a conduit means 22 to a desired location in the water storage tank 2 which is below the inlet to the conduit 8. The conduit means 22 includes a conventional relief valve 24 which is similar to the relief valve 10. Any desired solar collector 20 can be used. A simple collector comprises a length of tubing 23 formed in a serpentine fashion and placed in a location to maximize the effect of the sun on the tubing. To maintain a desired flow of water from the water storage tank 2 through solar collector 20 to the interior of the water storage tank 2, pump 15 is actuated by a control means 30 which has one sensor at 33 connected to the interior of the solar collector 20 and a second sensor 34 connected to the lower portion of the water storage tank 2.

A sensing conduit 35 connects the sensor 33 to the control means 30 and a sensing conduit 37 connects the sensor 34 to the control means 30. An electrical supply is directed to the control means 30 by an electrical conduit 38 which is plugged into an electrical receptacle 41, said electrical receptacle 41 being in turn connected to an electrical supply. Control means 30 is connected to the pump 15 by an electrical conduit 31. The sensor 33 is to indicate the temperature in the solar collector 20 due to the effect of the sun and the sensor 34 is to indicate the temperature of the water at a cool location in the water storage tank 2. When sensor 33 senses a temperature warmer than the temperature of the water at sensor 34 indicating a predetermined temperature differential, the control means 30 switches on the pump 15 and the water circulates through conduit 10 including one-way check valve 14, solar collector 20 and conduit 22 into water storage tank 2. Continued circulation results in a heat gain of the water in the water storage tank 2 when the pump 15 is running. In solar water heating systems constructed, one means 30 used switches the pump 15 on when the temperature at sensor 33 is 9° F. warmer than the temperature at sensor 34. Other temperature differentials can be used as desired. When the temperature differential is less than the predetermined value, the pump 15 is turned off by the control means 30. When this occurs, the one-way check valve 14 prevents reverse flow of the water.

In some conventional systems, a freeze sensor 40 is positioned adjacent the outlet 32 and connected to sensing conduit 35 by sensing conduit 42. When the temperature being recorded by the freeze sensor 40 drops to approximately 37° F., the freeze sensor 40, through control 30, energizes the pump 15 and starts the circulating flow as described above. This causes warm water to flow into the solar collector 20 and causes the temperature sensed by the freeze sensor 40 to rise, when the temperature rises to approximately 60° F. the circulating pump 15 ceases to operate. This freeze protection will operate successfully in this manner as long as external power is available to operate the pump 15. A control 30 as described is available from del Sol Control Corporation, 11914 U.S. 1, Juno, Fla. 33408.

Solenoid valve 19, referred to above, is connected by conduit 50 to electrical receptacle 41 so that while there is external power, the solenoid valve is maintained in a closed position. Now, when the electrical supply fails, all power to control 30 and solenoid valve 19 stops. The lack of electrical supply to control 30 prevents the freeze sensor 40 from operating the pump 15 as necessary. However, the loss of power to solenoid valve 19 allows it to open by its spring force, permitting the warmer fluid in the water storage tank 2 to rise through conduit means 22 and move through the solar collector 20 back to the bottom of the storage tank 2 through a portion of conduit means 13 and bypass means 16. The system is shown mounted between two areas separated by a roof 100 so that the water storage tank 2 and associated controls are positioned in an area where freezing conditions cannot be encountered, and the solar collector 20 and portions of the connecting conduits 22 and 13 are located externally of the roof 100 and are positioned in an area where freezing can be encountered. For optimum operation, the flow lines of the system should be insulated. After the solar water system has been installed and pressurized by the water admitted through conduit 4, it is ready for operation to deliver hot water through conduit 8 to a hand-operated fauct (not shown) or other control for hot water as desired.

Figure 2:
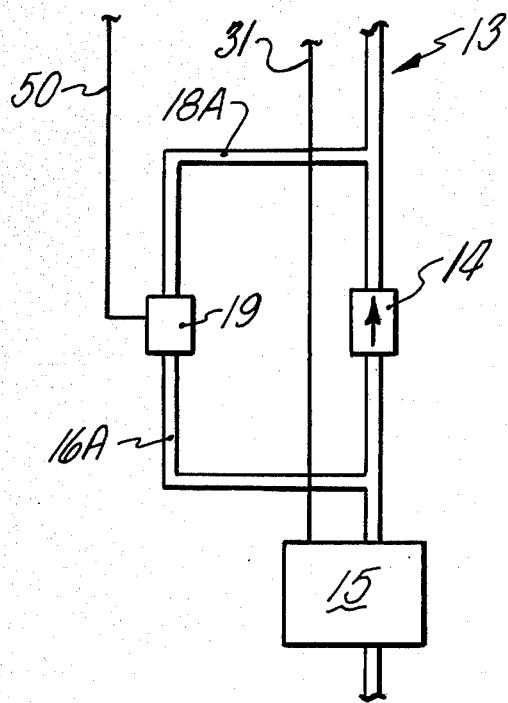
FIG. 2 is a modification of a part of FIG. 1 wherein the bypass means is shown only around the one-way check valve.

In FIG. 2 a modification is shown wherein a bypass means 16A has a conduit 18A with one end connected to conduit means 13 downstream of the one-way check valve 14 while the other end is connected upstream of the one-way check valve 14. This configuration is for use when pump 15 is of the type permitting reverse flow therethrough without any additional restriction thereto.

Figure 3:
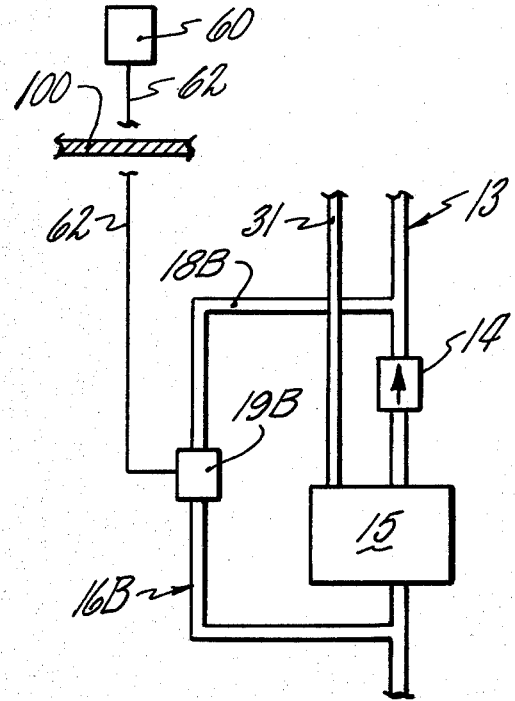
FIG. 3 is a modification of a part of FIG. 1 wherein the bypass means includes a valve controlled by a freeze sensor.

In FIG. 3 a modification is shown wherein the bypass means 16B has a conduit 18B with a thermally controlled valve means 19B located therein. A freeze sensor 60 is positioned adjacent the freeze sensor 40 and connected to valve means 19B by a sensing conduit 62. When the freeze sensor 60 senses a temperature several degrees below the sensed temperature of freeze sensor 40 for energizing the pump 15, the thermally controlled valve 19B is opened to permit reverse flow due to convection.

Figure 4:
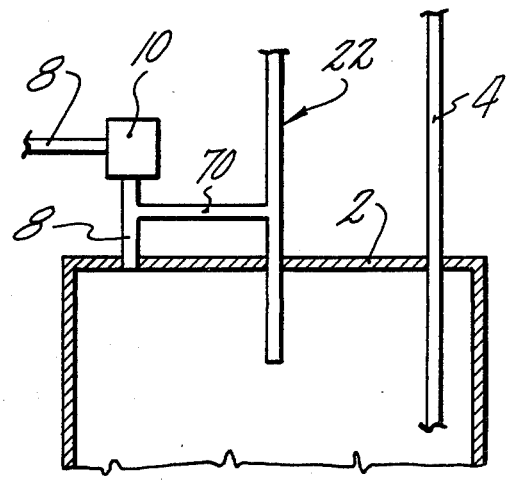

In FIG. 4, a modification is shown wherein the hot water outlet conduit 8 of the water storage tank 2 is connected to the conduit means 22 by a conduit 70 which will provide two inlets from the water storage tank 2 into conduit means 22 when reverse flow by natural convection is called for.

What is claimed is:

1. In a pressurized solar water heating system; a water storage tank; first conduit means for connecting a water supply to said tank; a solar collector having a flow passageway therethrough with an inlet and an outlet; second conduit means connecting the lower part of said water storage tank to the inlet of said solar collector for delivering water to said solar collector; third conduit means connecting the outlet of said solar collector to said water storage tank; said second conduit means, solar collector flow passageway, and third conduit means forming a continuous water conduit; fourth conduit means for directing water from said tank to a desired location; pump means operatively connected with said continuous water conduit for circulating water from said water storage tank through said second conduit means, solar collector flow passageway, and third conduit means back into said water storage tank; freeze control means including a bypass means operatively connected in said system to bypass said pump means for permitting flow from said water storage tank through said solar collector back into the water storage tank by natural convection.

2. In a pressurized solar water heating system; a water storage tank; first conduit means for connecting a water supply to said tank; a solar collector having a flow passageway therethrough with an inlet and an outlet; second conduit means connecting the lower part of said water storage tank to the inlet of said solar collector for delivering water to said solar collector; third conduit means connecting the outlet of said solar collector to said water storage tank; said second conduit means, solar collector flow passageway, and third conduit means forming a continuous water conduit; fourth conduit means for directing water from said tank to a desired location; pump means operatively connected with said continuous water conduit for circulating water from said water storage tank through said second conduit means, solar collector flow passageway, and third conduit means back into said water storage tank; one-way flow control means connected to said continuous water conduit for preventing reverse flow through said continuous water conduit; freeze control means including a bypass means operatively connected in said system to bypass said one-way flow control means for permitting flow from said water storage tank through said solar collector back into the water storage tank by natural convection.

3. A pressurized solar water heating system as set forth in claim 2 wherein said pump means includes a power source for operating it, said bypass means including a valve biased to a closed position which is opened when said power source fails permitting flow thereby by natural convection.

4. In a pressurized solar water heating system; a water storage tank; first conduit means for connecting a water supply to said tank; a solar collector having an inlet and an outlet; second conduit means connecting the lower part of said water storage tank to the inlet of said solar collector for delivering water to said solar collector; third conduit means connecting the outlet of said solar collector to said water storage tank; fourth conduit means for directing water from said tank to a desired location; pump means in said system for circulating water from said water storage tank through said second conduit means, solar collector and third conduit means back into said water storage tank when said solar collector can add heat to said water; one-way flow control means in said system with said pump means for preventing reverse flow through said second conduit means, solar collector and third conduit means; freeze control means for operating said pump means for circulating water from said water storage tank through said second conduit means, solar collector and third conduit means back into said water storage tank when heat can be added to the water in said solar collector to maintain a temperature of said water above freezing; said freeze control means including a bypass means connected around said one-way flow control means for permitting flow from said water storage tank through said solar collector and back into the water storage tank by natural convection when said freeze control means is ineffective to operate said pump means.

5. In a pressurized solar water heating system, a water storage tank, first conduit means for connecting a water supply to said tank, a solar collector having an inlet and an outlet, second conduit means connecting the lower part of said water storage tank to the inlet of said solar collector for delivering water to said solar collector, third conduit means connecting the outlet of said solar collector to said water storage tank, fourth conduit means for directing water from said tank to a desired location, pump means in said second conduit means for circulating water from said water storage tank through said solar collector and third conduit means back into said water storage tank when said solar collector can add heat to said water, one-way check valve in said second conduit means with said pump means for preventing reverse flow through said second conduit means, freeze control means including a bypass means connected to said second conduit means around said one-way check valve for permitting reverse flow from said water storage tank through said solar collector and back into the water storage tank by natural convection.

6. A combination as set forth in claim 5 wherein said bypass means comprises a solenoid valve located in a conduit, said conduit having one end connected to said second conduit means upstream of said one-way check valve while the other end is connected to said second conduit means downstream of said one-way check valve, said solenoid valve being biased to an open position, said solenoid valve being closed by connection to an electrical supply whereby when said electrical supply fails said solenoid valve will be biased to an open position permitting flow thereby due to convection from said water storage tank through said solar collector back to said water storage tank.

7. A combination as set forth in claim 6 wherein said conduit having one end connected to said second conduit means upstream of said one-way check valve is also connected to said second conduit means upstream of said pump means.

8. A combination as set forth in claim 5 wherein said third conduit means is connected to said fourth conduit means to provide two inlets to said third conduit means when flow by natural convection is called for.

9. A combination as set forth in claim 5 wherein said bypass means comprises a thermally controlled valve means located in a conduit, said conduit having one end connected to said second conduit means upstream of said one-way check valve while the other end is connected to said second conduit means downstream of said one-way check valve, said freeze control means having a first freeze sensor for sensing a predetermined temperature for operating said pump means for circulating water, said thermally controlled valve means being in a normally closed position, said thermally controlled valve means being connected by a sensing conduit to a second freeze sensor which opens said thermally controlled valve means when it senses a temperature several degrees below the sensed temperature of said first freeze sensor.

10. In a pressurized solar water heating system, a water storage tank, first conduit means for connecting a water supply to said tank, a solar collector having an inlet and an outlet, second conduit means connecting the lower part of said water storage tank to the inlet of said solar collector for delivering water to said solar collector, third conduit means connecting the outlet of said solar collector to said water storage tank, fourth conduit means for directing water from said tank to a desired location, pump means in said second conduit means for circulating water from said water storage tank through said solar collector and third conduit means back into said water storage tank when said solar collector can add heat to said water, one-way check valve in said second conduit means with said pump means for preventing reverse flow through said second conduit means, freeze control means for operating said pump means for circulating water from said water storage tank through said solar collector and third conduit means back into said water storage tank when heat can be added to the water in said solar collector to maintain a temperature of said water above freezing, said freeze control means including a bypass means connected to said second conduit means around said one-way check valve for permitting reverse flow from said water storage tank through said solar collector and back into the water storage tank by natural convection when said freeze control means is ineffective to operate said pump means.

* * * * *